(12) United States Patent
Taketomi et al.

(10) Patent No.: US 7,078,071 B2
(45) Date of Patent: Jul. 18, 2006

(54) GLASS COMPOSITE INCLUDING DISPERSED RARE EARTH IRON GARNET NANOPARTICLES

(75) Inventors: Susamu Taketomi, Manhattan, KS (US); Christopher M. Sorensen, Manhattan, KS (US); Kennth J. Klabunde, Manhattan, KS (US)

(73) Assignee: Matsumoto Yushi-Seiyaku Co., Ltd., Osaka (JP)

( * ) Notice: Subject to any disclaimer, the term of this patent is extended or adjusted under 35 U.S.C. 154(b) by 0 days.

(21) Appl. No.: 10/914,288

(22) Filed: Aug. 10, 2004

(65) Prior Publication Data

US 2005/0008875 A1    Jan. 13, 2005

Related U.S. Application Data

(62) Division of application No. 09/679,856, filed on Oct. 5, 2000, now Pat. No. 6,790,521.

(51) Int. Cl.
    *B05D 1/24*    (2006.01)
(52) U.S. Cl. .................. 427/130; 427/128; 427/165; 427/169; 427/443.2
(58) Field of Classification Search ........ 427/127–132, 427/162–169, 443.2; 250/483.1
See application file for complete search history.

(56) References Cited

U.S. PATENT DOCUMENTS

| 4,245,506 A | 1/1981 | Meiklejohn |
| 4,503,257 A | 3/1985 | Druliner et al. |
| 4,842,968 A | 6/1989 | Kojima et al. |
| 5,585,640 A * | 12/1996 | Huston et al. ........... 250/483.1 |
| 6,045,925 A | 4/2000 | Klabunde et al. |
| 6,057,488 A | 5/2000 | Koper et al. |
| 6,139,626 A * | 10/2000 | Norris et al. ............... 428/323 |

FOREIGN PATENT DOCUMENTS

JP    6-265837    *   9/1994

OTHER PUBLICATIONS

Taketomi, S. et al., "Peculiar sponge-like structure of yttrium-iron-garnet nanocrystals on quarts substrate surface," Journal of Applied Physics, vol. 386, No. 10, Nov. 15, 1999.

(Continued)

*Primary Examiner*—Fred J. Parker
(74) *Attorney, Agent, or Firm*—Jay Alexander; Milbank, Tweed, Hadley & McCloy LLP

(57) ABSTRACT

Glass/nanoparticle composites are provided which include a glass matrix with a high density of heterologous nanoparticles embedded therein adjacent the outer surfaces of the composite. Preferably, the glass matrix is formed of porous glass and the nanoparticles are yttrium-iron nanocrystals which exhibit the property of altering the polarization of incident electromagnetic radiation; the composites are thus suitable for use in electrooptical recording media. In practice, a glass matrix having suitable porosity is contacted with a colloidal dispersion containing amorphous yttrium-iron nanoparticles in order to embed the nanoparticles within the surface pores of the matrix. The treated glass matrix is then heated under time-temperature conditions to convert the amorphous nanoparticles into a crystalline state while also fusing the glass matrix pores. Nanoparticle loadings on the order of $10^9$ nanoparticles/mm$^2$ of glass surface area are possible, allowing construction of recording media having a recordable data density many times greater than conventional media.

40 Claims, 9 Drawing Sheets

(a) Before calcination    (b) After calcination

OTHER PUBLICATIONS

Taketomi, S. et al., "Structural effects on the magnetic character of yttirum-iron-garnet nanoparticles dispersed in glass composites," Journal of Applied Physics, vol. 93, No. 10, May 15, 2003, date.

Taketomi, S. "Morphology of Iron-Oxide Nanoparticle-Dispersed Glass Composites," The Japan Society of Applied Physics, vol. 43, No. 10, 2004, pp. 7350-7353, date.

* cited by examiner

GLASS COMPOSITE INCLUDING DISPERSED RARE EARTH IRON GARNET NANOPARTICLES

This application is a divisional of U.S. Ser. No. 09/679,856, filed Oct. 5, 2000, now U.S. Pat. No. 6,790,521.

BACKGROUND OF THE INVENTION

1. Field of the Invention

The present invention is broadly concerned with glass/nanoparticle composites, and especially composites containing embedded nanocrystals having desirable electrooptical properties allowing the composites to be used in high density recording media. More particularly, the invention is concerned with such composites, and methods of fabrication thereof, wherein the composites include a glass matrix body with rare earth iron garnet nanoparticles embedded therein. The composites are manufactured by contacting a suitable porous glass with a colloidal dispersion of nanoparticles to fill the glass pores, followed by heating of the treated glass to effect fusing of the glass matrix pores.

2. Description of the Prior Art

Ferromagnetic fine particles such as nanoparticles have attracted considerable attention from researchers in recent years. This interest stems from the fact that such particles are single magnetic domain particles and accordingly their magnetic properties and their mutual interaction can be studied without magnetic domain effects. Moreover, quantum size effects and the magnetic quantum tunneling effects of these particles can be studied because of their nanoparticle dimensions. From an industrial standpoint, such magnetic particles can be used as media for high-density magnetic or magneto-optical information source.

In light of these considerations, efforts have been made in the past to prepare nanoparticle compositions using a variety of different methods. A consistent problem with these prior techniques has been the tendency of the magnetic nanoparticles to spontaneously coagulate. Thus, the intrinsic magnetic characteristics of the nanoparticles are often difficult or impossible to discern even though the nanoparticle compositions were initially successfully prepared. A number of methods have been proposed to prevent the coagulation of magnetic nanoparticles, such as to disperse the particles in an organic binder (O'Grady et al., *J. Magn. Mater.*, 95:341 (1991)), or to disperse the particles in a solvent with an aid of a surfactant (Rosenweig, *Ferrohydrodynamics*, Cambridge University Press, 1985). These methods use mechanical stirring to disperse the particles, but nevertheless a considerable portion of the particles remain coagulated if the particle concentration is high.

In other research, magnetic fine particle precursors have been dispersed in sol-state glass precursor, the magnetic particles were precipitated in solidified glass or simple magnetic fine particles (e.g., elemental iron or cobalt or simple crystalline structure such as iron oxide) were introduced into the pores of porous glass. However, owing to the fact that these techniques involve the precipitation of precursor particles into a glass matrix, or ion sputtering on porous glass, it has been difficult to control the fabrication of the products. As a consequence, these methods have not been applicable using fine particles of complex crystalline structure.

SUMMARY OF THE INVENTION

The present invention overcomes the problems outlined above and provides new glass/nanoparticle composites and methods of fabrication thereof, allowing controlled production of very high nanoparticle density composites. Broadly speaking, the composites of the invention include a body of glass having embedded therein a plurality of heterologous nanoparticles, with at least certain of the nanoparticles having a diameter of up to about 500 nm. Preferably, the nanoparticles are characterized by the property of altering the polarization of incident electromagnetic radiation which is reflected or scattered from the nanoparticles. The most preferred type of nanoparticles are the rare earth iron garnet nanocrystals, especially yttrium-iron nanoparticles. Here, the term "nanoparticle" is defined as a particle, the size of which is between several nanometers and several hundred nanometers. The term "nanocrystal" is defined as a crystal grain the size of which is between a several nanometers and several hundred nanometers.

In forming the composites, a porous glass body such as "thirsty glass" is contacted with a dispersion including the heterologous nanoparticles, so that such nanoparticles locate within the surface pores of the glass body. Thereafter, the nanoparticle-treated glass body is heated to fuse the pores and embed the nanoparticles. Most preferably, the nanoparticles are initially in an amorphous state, and the heating step serves to transform these nanoparticles into a crystalline state. These methods produce stable composites which can be used as a part of electrooptical recording media. Nanoparticle loadings on the order of $10^9$ nanoparticle/mm$^2$ of glass surface area are possible. This allows construction of recording media having a recordable data density many times greater than conventional media.

DETAILED DESCRIPTION OF THE PREFERRED EMBODIMENT

Figure 1:
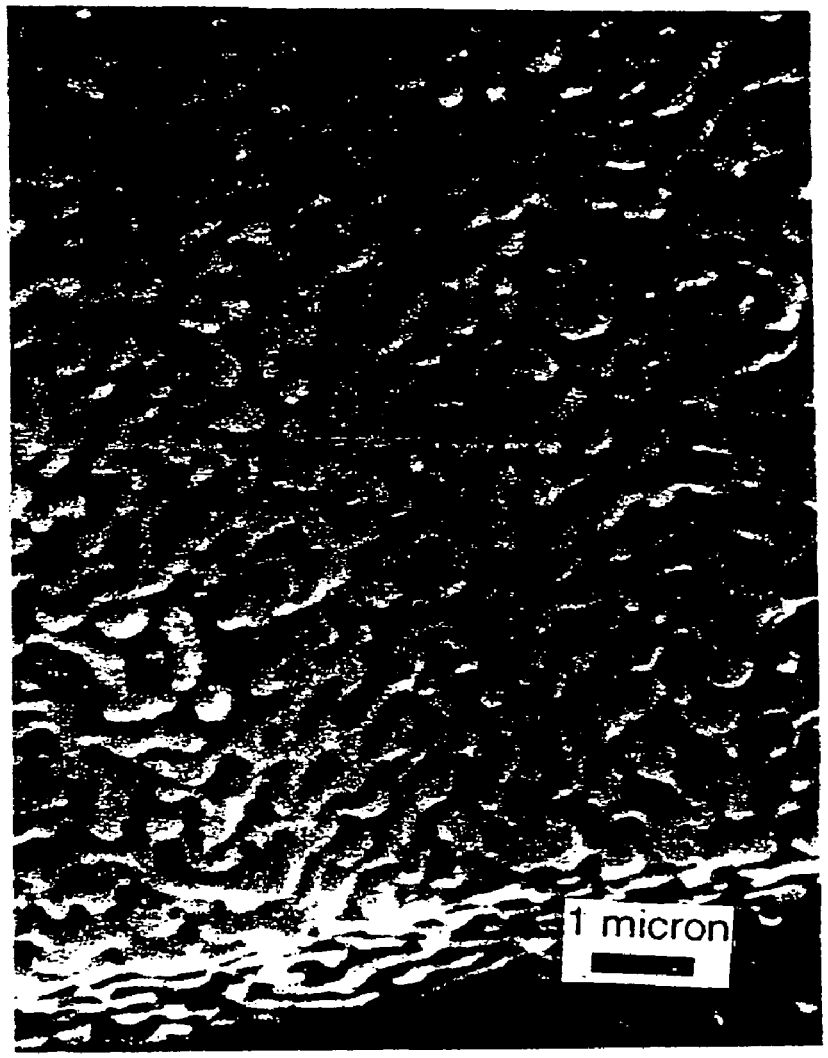
FIG. 1 is a scanning electron micrograph of the microporous surface of controlled pore glass useful in forming the composites of the invention.

The following examples set forth the production and testing of exemplary glass/nanoparticle composites in accordance with the invention. It is to be understood, however, that these examples are provided by way of illustration and nothing therein should be taken as a limitation upon the overall scope of the invention.

Preparation Methods

The amorphous YIG nanoparticles were prepared by the alkoxide method. Broadly speaking, in this method the starting materials are solutions of $Fe^{3+}$ alkoxide $Fe(OR)_3$ and a solution of yttrium alkoxide $Y(OR')_3$ where R and R' are respectively taken from the group consisting of the alkyl groups. The two solutions are mixed to provide a stoichiometric Fe:Y ratio of 5:3, and the mixture is heated to boiling with vigorous stirring. Hot water vapor is introduced into the mixture to cause hydrolysis, thereby yielding nanoparticles of the mixture of amorphous iron oxide and yttrium oxide expressed by the equation

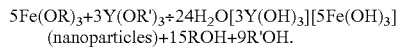
(nanoparticles)+15ROH+9R'OH.

Nanoparticles of the chemical formula, $Fe_5Y_{3-x}M_xO_{12}$, or $Fe_5Y_{3-x-y}M_xN_yO_{12}$ can be prepared according to the reaction

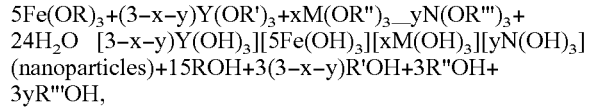

where, M and N denote either Bi, Gd, In or rare earth elements La, Ce, Pr, Nd, Pm, Sm, Eu, Tb, Dy, Ho, Er, Tn, Yb and Ln. x and y denote the numbers satisfying 0 x÷y 1, R" and R'" denote alkyl groups.

In the present case, iron ethoxide and yttrium butoxide were mixed and hydrolyzed to prepare amorphous YIG nanoparticles of 9 nm mean diameter, expressed by the chemical reaction,

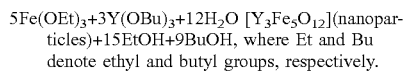
where Et and Bu denote ethyl and butyl groups, respectively.

The primary nanoparticles resulting from this reaction coagulated with each other to form aggregates or secondary particles. These secondary particles were obtained from the reaction mixture by centrifugation. Next, the secondary particles were dispersed in kerosene together with oleic acid surfactant, followed by ball milling. During this process, the secondary particles were broken down and their surfaces coated with surfactant in order to yield a stable dispersion. If the surface particles from this treatment are not completely covered with surfactant molecules, a secondary procedure may be followed. After the ball milling step, additional oleic acid and aqueous ammonia are added to create ammonium oleate in the dispersion. This solution is then vigorously stirred using a homogenizer with heating to a temperature of up to about 98° C. The ammonium oleate decomposes to gaseous ammonia and oleic acid above 78° C. and the isolated oleic acid adhere to the surfaces of the nanoparticles.

The surfactant-coated nanoparticles have a variable size distribution, with the larger particles precipitating in the dispersion, yielding a supernatant containing particles of up to about 30 nm. The supernatant split into two layers, water layer (lower) and kerosene layer (upper) in which the particles are dispersed. The kerosene-solvent phase was decanted and condensed by evaporating part of kerosene solvent.

The porous glass used was controlled porous glass (CPG) prepared by the method described by Haller: Haller, W., *J. Chem Phys,* 42:686 (1965); Haller, W., Nature, 286:693 (1965); and Haller, W., *Solid Phase Biochemistry,* Chap. 11, Wiley, N.Y. (1983), all of which are incorporated by reference herein. In particular, CPG is manufactured by rapidly cooling a ternary oxide melt ($SiO_2$—$B_2O_3$—$Na_2O$) until it solidifies into a homogeneous glass. After reheating and annealing at elevated temperature, the glass segregates into two interconnected phases, an almost pure silica phase and a sodium borate phase having some silica dissolved therein. In the final step, the sodium borate phase is removed by acid treatment and silica debris is cleaned from the resultant pores. The CPG contains traces of $B_2O_3$ and $Na_2O$ which may play a role in the subsequent catalysis of the reaction between $SiO_2$ and YIG particles. FIG. 1 is an SEM photograph of a carbon replica of the surface of typical CPG. In the present examples, four CPG's with different pore sizes were employed, and were obtained from W. Haller of the National Institute of Standards and Technology, and from CPG, Inc. of Fairfield, N.J. The mean pore sizes and size distributions were 48.6 nm±3.9%, 114 nm±5.2%, 204 nm±11.5% and 292 nm±7.1%. The particle size of the 48.6 nm pore size CPG ranged between 75–125 μm while the rest were between 37–74 μm.

Figure 2:
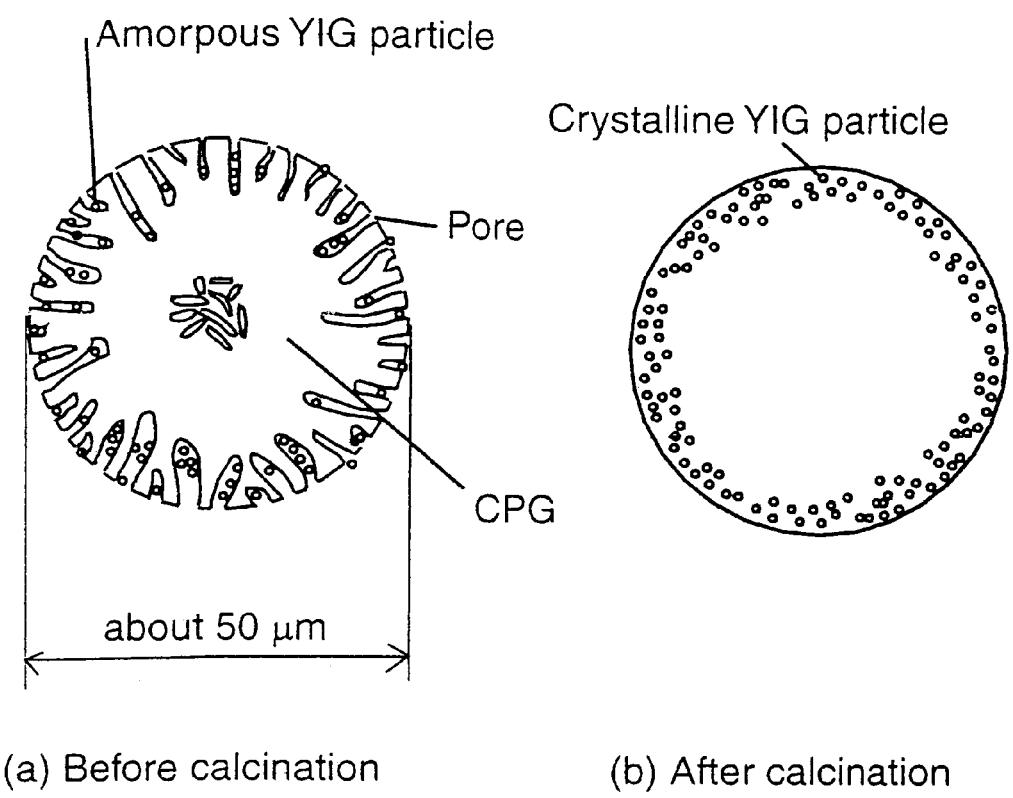
FIG. 2 is a schematic representation illustrating controlled pore glass with nanoparticles located within the pores thereof to form a glass/nanoparticle composite, both before and after calcination of the composite.

The CPG particles were soaked in the YIG colloidal dispersion in order to allow the amorphous YIG particles to pass into the pores of the CPG. This is schematically illustrated in FIG. 2(*a*). The soaking was conducted at room temperature for a period of about 24 hrs. Next, the soaked CPG powder was left in the air and the solvent was evaporated.

After drying, the amorphous nanoparticle-loaded CPG was calcined using an electric furnace. The temperature was increased from ambient at a rate of 200° C. per hour to a maximum temperature $T_0$ and held at that temperature for $t_0$ hrs. The samples were then cooled to room temperature. Calcining had the effect of converting the amorphous YIG into the crystalline particles, and also of fusing the CPG pores so as to fully embed the YIG particles within the glass. (This is schematically illustrated in FIG. 2(*b*).) The characteristics of the calcined composites are set forth in Table 1. All composites were calcined in air except for samples $B_3$ and D, which were calcined in a $N_2$ gas environment.

TABLE 1

Characteristics of Samples[a]

| Samp. | $T_0$ | $t_0$ | Prepared compounds identified from XRD | D |
|---|---|---|---|---|
| $A_1$ | 700 | 2 | Cristobalite(1), $Fe_5Y_3O_{12}$ | 4.2 |
| $A_2$ | 800 | 2 | Cristobalite(1), $Fe_5Y_3O_{12}$ | 37 |
| $A_3$ | 850 | 2 | Cristobalite(1), $Fe_5Y_3O_{12}$, $Y_2Si_2O_7(1)$, $Fe_2SiO_4(1)$, $Y_2SiO_5$ | unknown |
| $A_4$ | 900 | 2 | Cristobalite(1), $Fe_2O_3$, $Y_2Si_2O_7(1)$, $Y_2Si_2O_7(2)$, $Fe_2SiO_4(2)$, $Y_2SiO_5$ | None |
| $A_5$ | 1000 | 2 | Cristobalite(1), $Fe_2O_3$, $Y_2Si_2O_7(1)$, $Y_2Si_2O_7(2)$, $Fe_2SiO_4(2)$, $Y_2SiO_5$ | None |
| $A_6$ | 675 | 16 | Cristobalite(1), $Fe_5Y_3O_{12}$, $Y_2Si_2O_7(1)$ | 11.2 |
| $A_7$ | 700 | 16 | Cristobalite(1), $Fe_5Y_3O_{12}$, $Y_2Si_2O_5(1)$ | 22.0 |
| $A_8$ | 793 | 0.1 | Cristobalite(1), $Fe_5Y_3O_{12}$, $Y_2Si_2O_7(1)$ | 37.0 |
| $A_9$ | 890 | 0 | Quartz, $Fe_5Y_3O_{12}$ | 41.0 |
| $B_1$ | 700 | 2 | Cristobalite(2), $Fe_5Y_3O_{12}$, $Y_2SiO_5$ | Unknown |
| $B_2$ | 800 | 2 | Cristobalite(1), $Fe_2O_3$, $Y_2O_3$ | None |
| $B_3$ | 900 | 2 | Cristobalite(1), $Y_2Si_2O_7(1)$, $Y_2Si_2O_7(2)$, $Y_2SiO_5$, $Fe_2SiO_4(1)$ | None |
| $B_4$ | 1200 | 2 | Cristobalite(2), $Fe_2O_3$, $Y_2O_3$ | None |
| C | 800 | 2 | Cristobalite(1), $Fe_5Y_3O_{12}$ | Unknown |
| D | 900 | 2 | Cristobalite(1), $Fe_2O_3$, $Y_2Si_2O_7(1)$, $Y_2Si_2O_7(2)$ | None |

[a]$T_0$: calcination temperature (C.), $t_0$: calcination time (h), D: YIG nanocrystal's mean diameter (nm), sample $A_1$(I = 1–9); CPG pore size before calcination 292 nm, sample $B_1$(i = 1–4); CPG pore size before calcination 48.6 nm, sample C: CPG pore size before calcination 204 nm, sample D: CPG pore size before calcination 114 nm. The compounds were identified according to the Powder Data File of Joint Committee on Powder Diffraction Standard (JCPDS). The compounds correspond to the JCPDS number, respectively. Cristobalite(1): 39-1425, cristobalite(2): 76-0936, quartz:93-2465, $Fe_5Y_3O_{12}$: 43-0507, $Y_2Si_2O_7(1)$: 45-0042, $Y_2Si_2O_7(2)$; 21-1459, $Fe_2SiO_4(1)$: 71-1667, $Fe_2SiO_4(2)$: 72-0297, $Y_2SiO_5$: 21-1461, —$Fe_2O_3$: 80-2377, —$Fe_2O_3$: 16-0653, $Y_2O_3$: 44-0399.

Sample Characterization

1. Transmission Electron Microscope Analysis. The calcined composites were ground in an agate mortar to reduce the grain size from about 50 μm to submicron size. The milled powder was mostly pure silica without YIG particles, because the YIG particles in the original CPG grains were concentrated primarily in a 0.5 μm subsurface layer. Significant color changes were observed after removing this subsurface layer. For example, sample $B_4$ was tinged with deep red color due to the presence of —$Fe_2O_3$ which was formed by the decomposition of YIG particles during calcination. After grinding, the color changed to white pink because of white cristobalite in the core of CPG grains revealed by the grinding. The ground powder was put in a vial filled with 97% ethanol and stirred strongly. Before all the fragments deposited in the bottom of the vial, the supernatant liquid was removed so that excess pure silica fragments were removed. The specific gravity of CPG fragments which contained YIG nanocrystals was greater than that of pure CPG fragments. In addition, the former fragments were easy to coagulate due to the YIG magnetic attraction. Accordingly, the CPG fragments with YIG nanocrystals deposited faster than the pure CPG fragments. Taking advantage of this phenomena, the CPG fragments were separated. This process was repeated several times. The liquid was stirred strongly and a droplet of the liquid was put on polymer film of a copper mesh TEM slide, and the CPG fragments were observed by two TEM's, a Philips 201 and a CM100, operating at 100 kV. Representative TEM photographs for samples $A_1$–$A_3$ are set forth in FIGS. 7–9.

2. X-Ray Diffraction Analysis. Phase composition of the ground samples which were prepared for TEM observation was investigated using XRD (XDS2000 Scintag Inc.). To increase the signal/background ratio from YIG particles, the slit width of the diffractometer was increased five times and the measuring time was increased 20 times in comparison with the ordinary slit width and the measuring time, respectively. Despite that, the diffraction intensity from YIG particles was very low. The diffraction intensity increased with angle decrease due to the small angle peak of the polymer substrate. The diffraction peak width widening due to the slit width was compensated for by calibration using standard micron-size multicrystalline quarts. Using the half value width of diffraction peaks, $\Delta$ and $\Delta_{st}$ for the YIG nanocrystals of the present samples and the standard quartz sample, respectively, the mean crystalline size, D, of YIG nanoparticles in the silica matrix was determined by $$D = \frac{0.9\lambda}{(\Delta - \Delta_{st})\cos\theta}$$

where $\lambda$—1.54 Å is the X-ray wavelength and 2 is the diffraction angle.

Results and Discussion

Figure 7:
FIG. 7 is a transmission electron microscope (TEM) photograph of a controlled porous glass/nanoparticle composite in accordance with the invention (sample $A_1$)

FIG. 7 is the TEM photograph of sample $A_1$ calcined for 2 hrs at 700° C. The small black dots in the silica matrix are the crystalline YIG particles as indicated by XRD in the lower part of FIG. 3. Large particles are pure silica fragments. In FIG. 7, there are 3–5 particles in a square of 100 nm side. It means that the particles number density of $0.3 \times 10^9$ to $0.5 \times 10^9$ per square mm of body surface. The melting temperature of CPG is between 900 and 1000 C. The region with YIG particles easily melted or softened at less than 700 C., presumably because the YIG particles served as contaminants and promoted pore closure of CPG. Using selected area electron diffraction (SAED) techniques, it was concluded that a very small portion of the matrix silica was crystallized but that the amount of crystallized silica, or cristobalite, was so small that the electron diffraction lines of cristobalite could not be detected in the TEM analysis.

Figure 8:
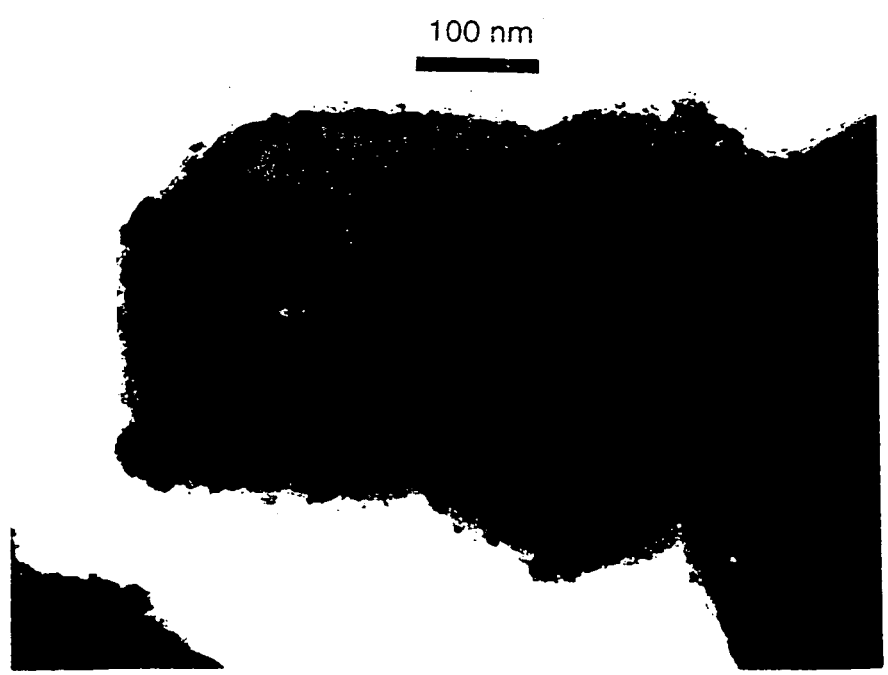
FIG. 8 is a TEM photograph of a controlled porous glass/nanoparticle composite in accordance with the invention (sample $A_2$)

FIG. 8 is a TEM photograph of sample $A_2$. From this analysis, cristobalite and YIG were identified from the SAED patterns, which is consistent with the result of XRD analysis of FIG. 5.

Figure 9:
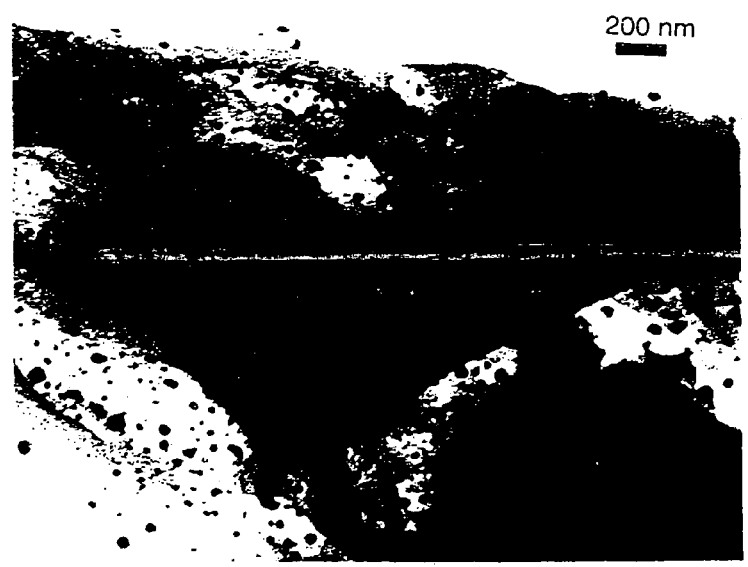
FIG. 9 is a TEM photograph of a controlled porous glass/nanoparticle composite in accordance with the invention (sample $A_3$)

FIG. 9 is a TEM photograph of sample $A_5$. The nanoparticles (black dots) are dispersed and embedded in the silica matrix.

Figure 3:
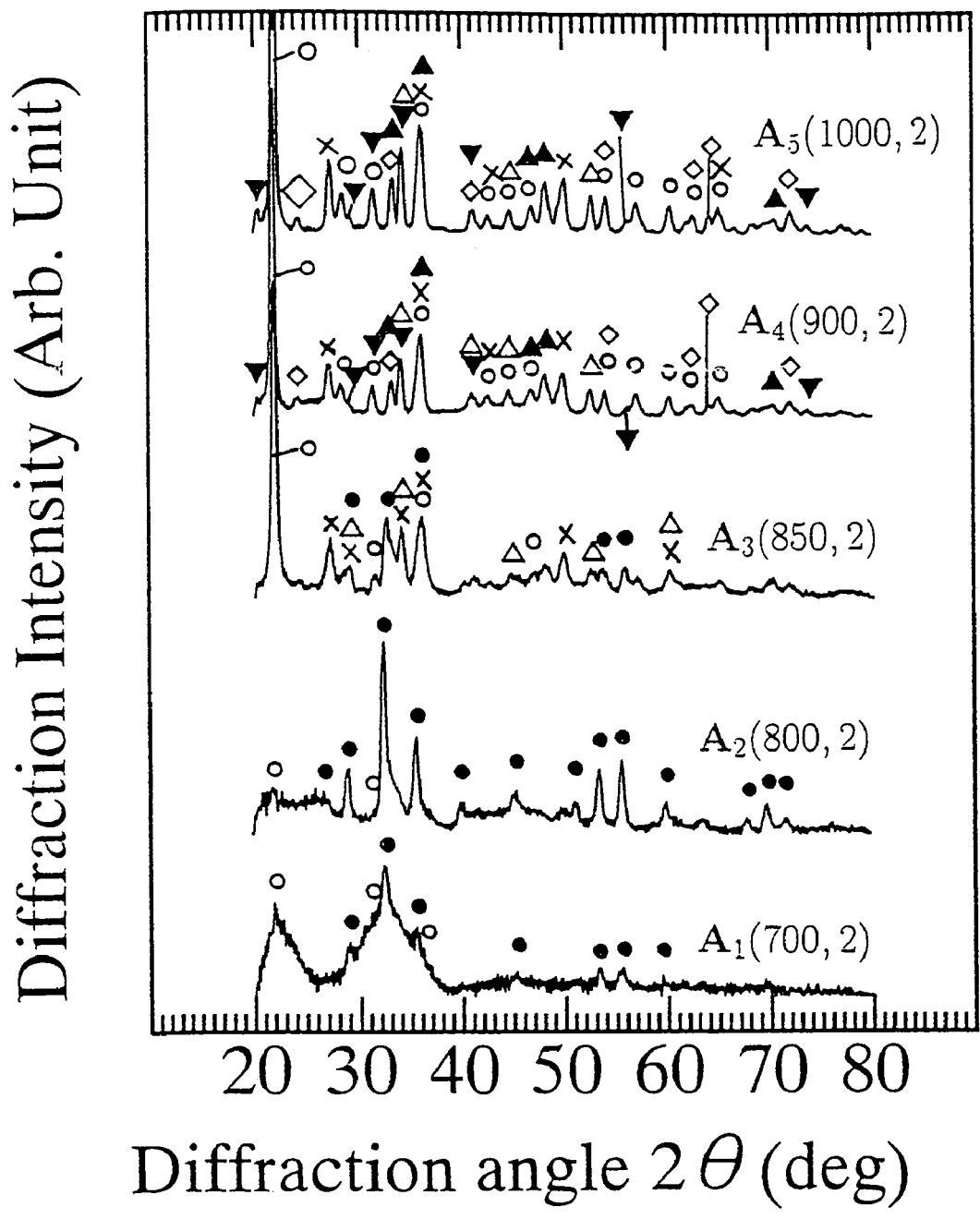
FIG. 3 is a graph containing X-ray diffraction (XRD) patterns for individual samples of large pore (292 nm pore size before calcination) controlled pore glass/nanoparticle composites formed using different maximum calcination temperatures with the same holding time (2 hrs), wherein the following legend is applicable: •: $Fe_5Y_3CO_{12}$, ○: cristobalite (1), ⊙: cristobalite(2), ⊛: quartz, △: $Y_2Si_2O_7(1)$, ▲: $Y_2Si_2O_7$ (2-), ∇: $Fe_2SiO_4(1)$, ▼: $Fe_2SiO_4(2)$, x: $Y_2SiO_5$, : ◇—$Fe_2O_3$, ◆: $\epsilon$-$Fe_2O_3$, □: $Y_2O_3$; cristobalite(1), cristobalite(2) etc. denote polymorphisms which are shown in captions of Table 1.

FIG. 3 illustrates XRD patterns from the samples after calcination at the temperatures from 700° C. to 1000° C. (samples $A_1$–$A_5$). The pore size of CPG before calcination was 292 nm and the calcination time, $t_0$, was 2 hrs for all the samples. The XRD curves are all shown without smoothing treatment.

In order to estimate YIG crystal sizes, YIG crystals were prepared alone using the corresponding calcination temperatures. The means crystalline sizes D, of the YIG nanoparticles were estimated by the half value width, $\Delta$, of the (420) peak (2=32.314) and $\Delta_{st}$ of the (112) peak (2=50.138) of standard multicrystalline quartz, using the above formula. The D value for each sample is shown in Table 1. YIG's D increases rapidly with the calcination temperature.

Many iron silicate and yttrium silicate compounds were generated by the reaction of YIG particles and CPG or silicate, particularly the samples of $T_0$ above 850° C. The identified products are tabulated in Table 1. In addition, there are a few peaks which were not be identified. There are several polymorphisms for the same chemical formula of iron silicate and yttrium silicate. Therefore, it may be that several polymorphisms of iron silicate and yttrium silicate were generated in the contact region between YIG particles and CPG.

Figure 4:
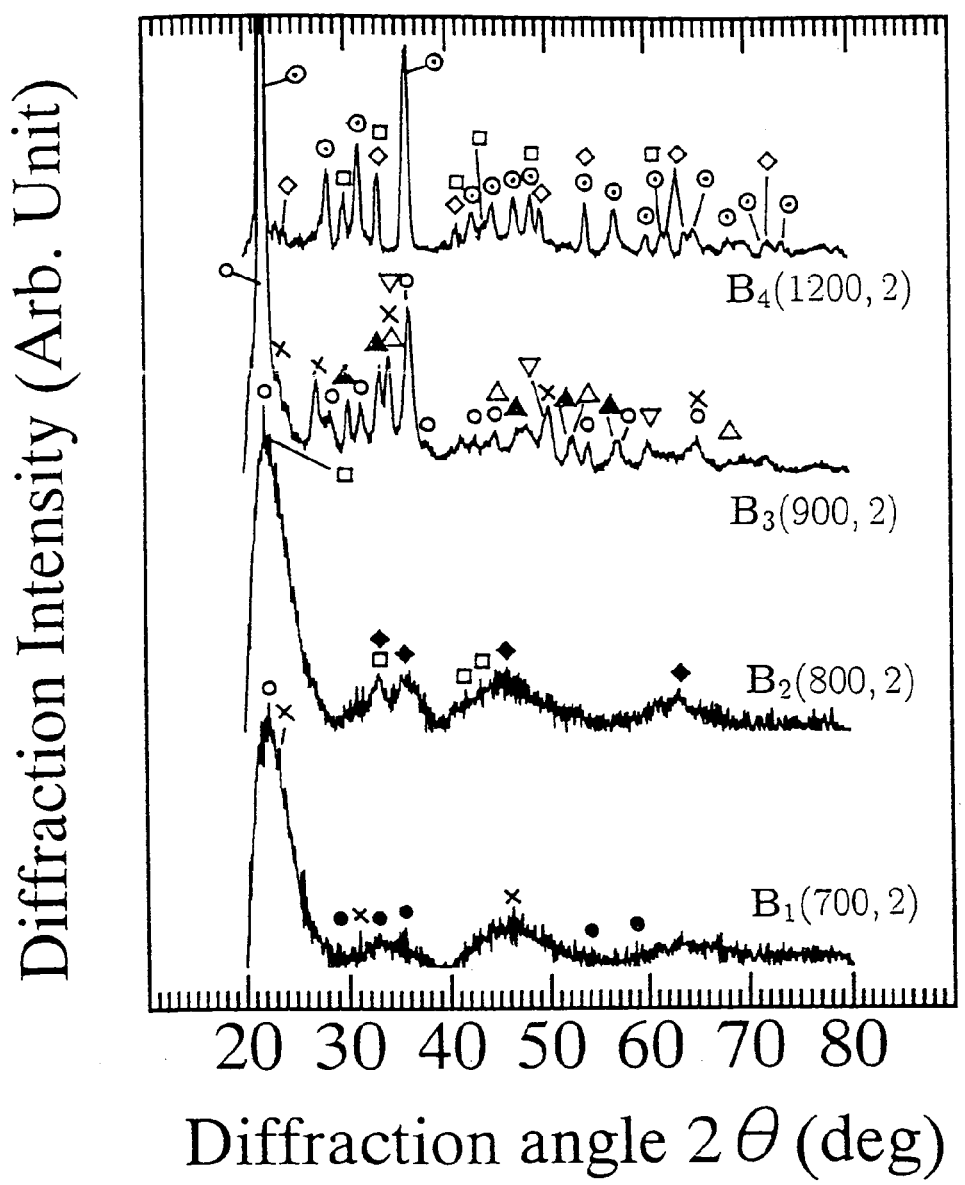
FIG. 4 is a graph containing XRD patterns for individual samples of small pore (48.6 nm pore size before calcination) controlled pore glass/nanoparticle composites formed using different maximum calcination temperatures with the same holding time (2 hrs), wherein the FIG. 3 legend is applicable.

FIG. 4 shows the XRD patterns of the samples of $T_0$ at 700° C. and up to 1200° C. with small CPG pores (samples $B_1$–$B_4$). The calcination time $t_0$ was 2 hrs and the mean pore diameter before calcination was 48.6 nm for all the samples. All the samples were calcined in the air except sample $B_3$ which was calcined in a $N_2$ gas environment. The YIG particles were decomposed to different compounds for the samples of $T_0$ at 800° C. In addition, the iron and yttrium silicate disappeared and YIG particles decomposed almost to $\epsilon$-$Fe_2O_3$ and $Y_2O_3$ for the sample of $T_0$—1200° C.

Figure 5:
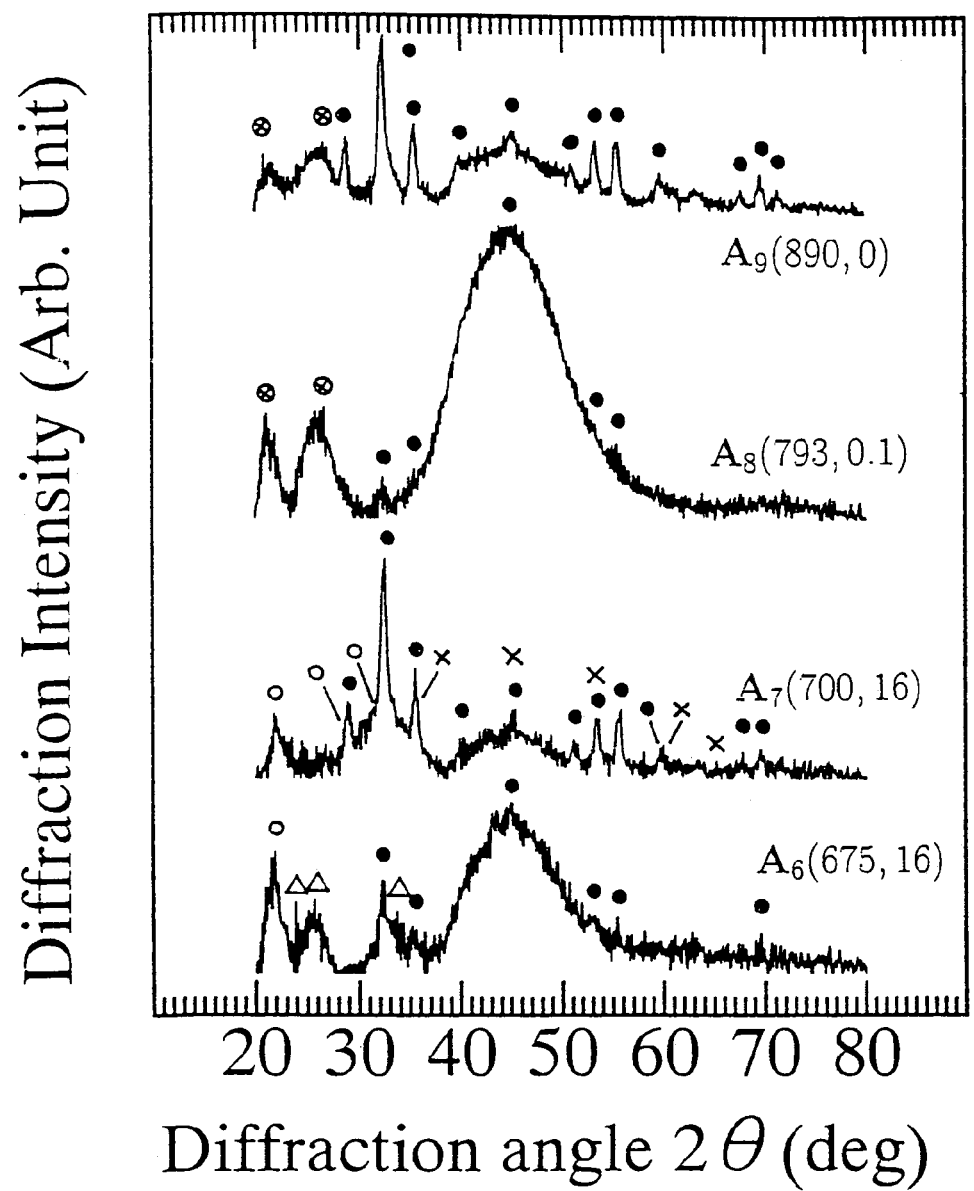
FIG. 5 is a graph containing XRD patterns for individual samples of large pore (292 nm pore size before calcination) controlled pore glass/nanoparticle composites formed using different maximum calcination temperatures and different holding times, wherein the FIG. 3 legend is applicable.

FIG. 5 shows XRD patterns of the samples for different calcination time, $t_0$ from 0 to 16 hrs (samples $A_6$–$A_9$) using different $T_0$ values. In this case of sample $A_9$, when the furnace temperature reached 890° C., it was immediately turned off and the sample was allowed to cool in the furnace to ambient. From the results of sample $A_6$, it was found that YIG particles and silicate reacted to form iron and yttrium silicate during the extended heat treatment, even at a low-temperature calcination of 675° C. This indicates that iron or yttrium silicates are more stable than the separated state of YIG and silica. The formation of the iron and yttrium silicate at such a low temperature may also indicate that the contaminants, $B_2O_3$ and $Na_2O$ in CPG played a role as catalysts for the reaction of YIG particles and CPG to form yttrium and iron silicate.

Figure 6:
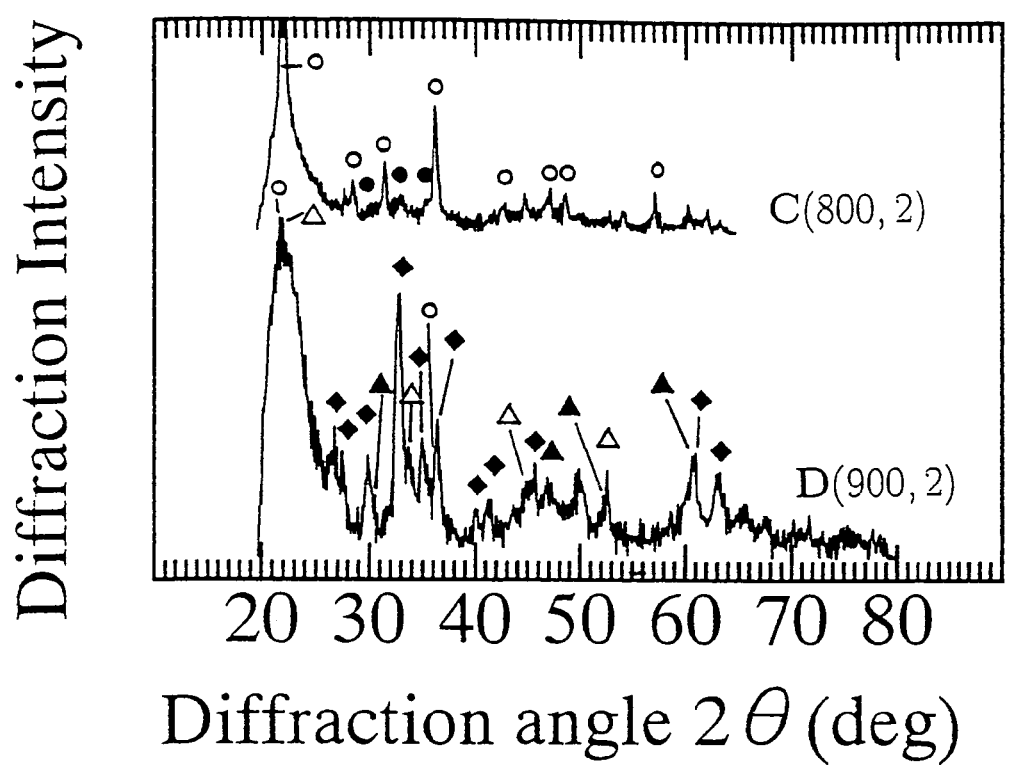
FIG. 6 is a graph containing XRD patterns for individual samples of controlled pore glass/nanoparticle composites formed using controlled pore glasses of different pore sizes (114 and 204 nm before calcination, respectively) and with different maximum calcination temperatures and the same maximum temperature holding time (2 hrs), wherein the following legend is applicable.

FIG. 6 shows the XRD results for the samples of pore size 204 and 114 nm before calcination (samples C and D). Sample D was calcined in a $N_2$ gas environment. The $B_2$ and D samples showed the preserve of $\epsilon$-$Fe_2O_3$, an uncommon and special oxide.

Figure 10:
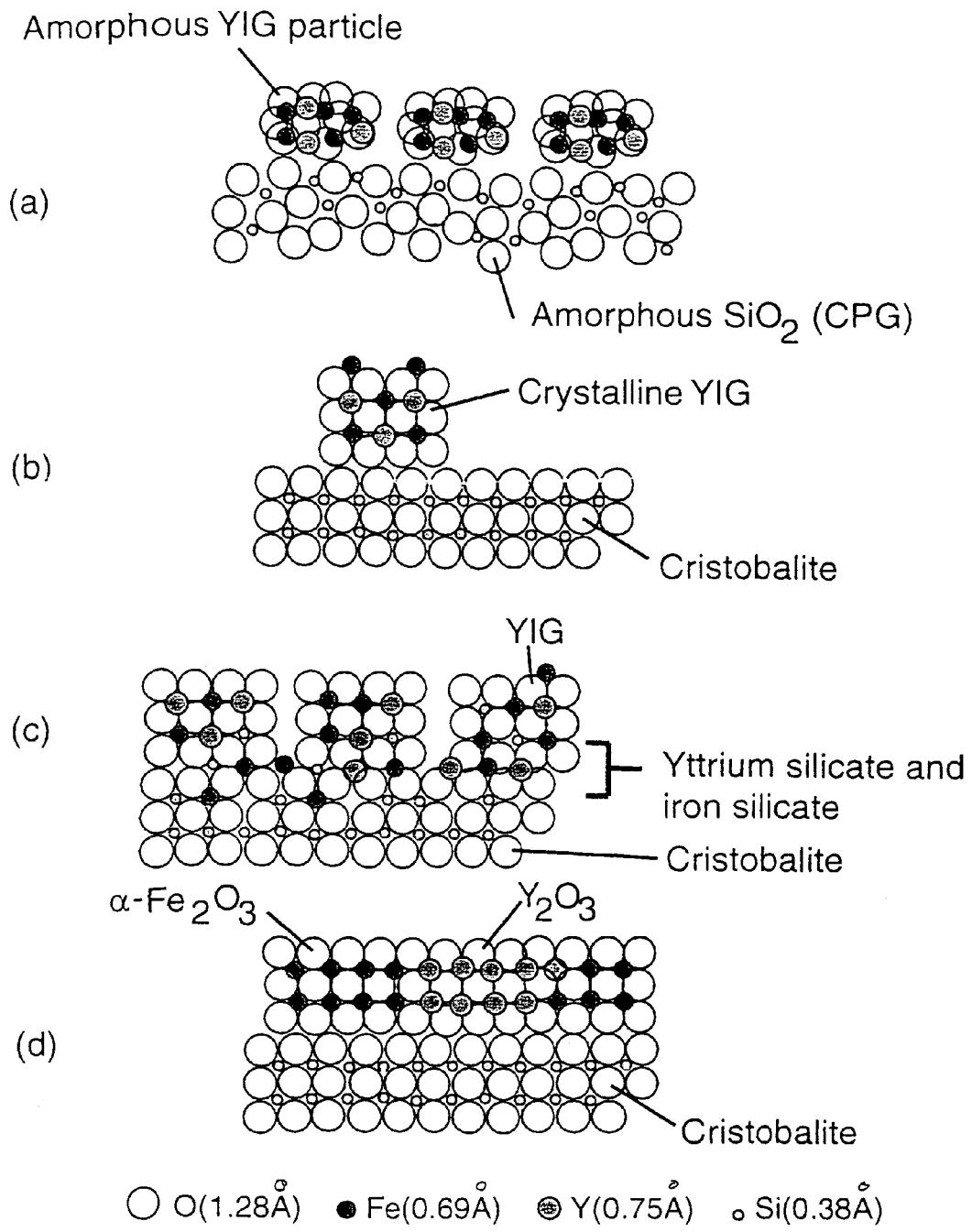
FIG. 10 is a schematic representation of possible physical processes occurring during calcination of the preferred controlled porous glass/yttrium-iron nanoparticle composites of the invention, including: (a) before calcination, both YIG particles and CPG are amorphous; (b) the crystallization of amorphous YIG particles and amorphous silicate, or CPG; (c) reaction between YIG particles and CPG on the boundary; and (d) decomposition of iron and yttrium silicate to $\epsilon\text{-Fe}_2\text{O}_3$ and $Y_2\text{O}_3$ at high temperature calcination. The circles' radius is proportional to stable iron and yttrium compounds.

It is believed that three different processes occur in parallel during calcination to form the composites of the invention. FIG. 10 includes schematic representations of these processes. FIG. 10$a$ is the state before the calcination. Both the particles and the CPG are in an amorphous phase. The radius of the circles which denote oxygen, iron, yttrium and silicon ions, respectively, are proportional to each ion's radius. The first process is the phase transition of YIG particles from amorphous to crystalline state. The second process is the phase transition of CPG from amorphous to cristobalite crystal. These two processes are shown in FIG. 10$b$. The third process is the reaction of YIG particles and contact with CPG to generate iron silicate and yttrium silicate, which is schematically shown in FIG. 10$c$. The third process proceeds slowly compared with the first and second processes in low-temperature calcinations. Accordingly, it is believed that only the first and second processes proceed in low temperature-short time calcinations. The CPG of small pore size has large surface area contacting the YIG particles, and accordingly the third process proceeds even in low temperature-short time calcination. In addition, in high temperature calcinations as high as 1200° C., the yttrium and iron silicate transformed to more stable compounds $\epsilon$-$Fe_2O_3$, $Y_2O_3$, and $SiO_2$ (see FIG. 10$d$).

In conclusion, for the purpose of preparing YIG nanocrystals dispersed in silica glass, the calcination should most preferably be carried out by increasing the temperature as rapidly as possible and immediately after the temperature reaches a temperature near 900° C., at which the amorphous YIG particles are crystallized, the temperature should be decreased in order to minimize the reaction between YIG and silica.

While the foregoing examples set forth preferred methods and glass/nanoparticle composites, the invention is not so limited. For example, the invention broadly involves the embedment of heterologous nanoparticles (i.e., nanoparticles chemically different from the constituents of the glass matrix) of any physical type (for example, amorphous or crystalline, in the latter case as single crystals or crystallites), so long as the particles have a maximum diameter of up to about 500 nm, more preferably of up to about 300 nm, and most preferably from about 10–150 nm. The preferred nanoparticles are rare earth iron garnet nanoparticles, especially yttrium-iron nanoparticles. In the latter case, nanoparticles having the formula $Fe_5Y_{3-x-y}M_xN_yO_{12}$ where M and N are different and are respectively taken from the group consisting of Bi, Gd, In, La, Pr, Nd, Pm, Sm, Eu, Tb, Dy, Ho, Er, Tn, Yb and Ln, and x and y are selected to satisfy the equation $0 \leq x+y \leq 1$ can be used to good effect.

The glass component of the composites of the invention is preferably made up of a porous glass, especially "thirsty glass." The latter type of material is described in U.S. Pat. Nos. 4,503,257 and 4,842,968 (both of which are incorporated by reference herein) as well as the Haller references previously cited. The starting porous glass should have a pore diameter of up to about 15–400 nm, and more preferably up to about 50–300 nm. After the calcining step, the pores of the glass are fused to envelope and embed the nanoparticles therein.

The preferred composites have a relatively high density of nanoparticles embedded therein. Advantageously, the nanoparticles should be present at a level of from about $10$–$10^9$ nanoparticles per $mm^2$ or glass body surface, and more preferably from about $10^7$–$10^9$ nanoparticles per $mm^2$ or body surface. If we assume uniform dispersion of the particles in the surface layer, the particles number densities per square nm is equivalent with the following conditions. Advantageously, the nanoparticles should be present at a level of from about $10^3$–$3 \times 10^{13}$ per cubic mm of glass body surface layer and more preferably from about $3 \times 10^{10}$ to $3 \times 10^{13}$ per cubic mm of the glass body surface layer.

The composites find particular utility as electrooptical recording media. This stems from the fact that the nanoparticles have an important electrooptical property. Specifically, when the nanoparticles are subjected to incident electromagnetic radiation of known polarization, the reflected or scattered radiation from the particles has a changed polarization. This allows one bit of memory to be assigned to each individual nanocrystal. Thus, the composites can be used as an efficient, high density recording medium.

In the manufacture of the composites, starting porous glass bodies are provided. The glass bodies are preferably contacted with a dispersion including the heterologous nanoparticles, so as to cause at least certain of the latter to locate within the pores of the glass. Thereafter, the dispersion-treated glass is subjected to heating (calcining) in order to fuse the pores and thus fully embed the nanoparticles located therein. Preferably, when the yttrium-iron garnet nanoparticles are used, the heating process also has the effect of converting the nanoparticles in situ from an amorphous to a crystalline state.

The heating or calcining step is of importance in determining the characteristics of the final composite product. Generally speaking, the heat should be conducted so that the amorphous YIG nanoparticles is heated to a maximum temperature of at least about 650° C. for a period of time to effect the amorphous YIG crystallizing. The preferable temperature depends on the period of time. For example, if we adopt 2 hrs of period of time, the temperature is more preferable from 650–900° C. and most preferably about 800° C. On the other hand, if the period of time is 0, the temperature is preferably from 850–950° C. and most preferably about 900° C. In addition, for the latter case, i.e., 0 hour period of time, the heating rate should be at least about 100° C. per hour more preferably faster than 200° C. per hour and after reaching the maximum temperature, sample should be cooled faster than 100° C. per hour and preferably faster than 200° C. per hour.

In conclusion for the period time ranging from 0.5 hr to 20 hrs, the temperature is more preferable from 650–900° C. and most preferable about 800° C. For the period time ranging from 0 to 0.5 hrs, the temperature is preferably from 850–950° C. and most preferably about 900° C. with extra conditions of the heating rate at least about 100° C. per hour, and more preferably faster than 200° C. per hour and after reaching the maximum temperature, cooling rate faster than 100° C. per hour and preferably faster than 200° C. per hour.

We claim:

1. A method of forming a composite comprising of the steps of:
   providing a porous glass body;
   contacting said body with a dispersion including amorphous nanoparticles,
   and causing at least some of said nanoparticles to locate within pores of said body; and
   fusing said pores to embed said nanoparticles located in said body;
   wherein said fusing step comprises the step of heating said body by progressively increasing the temperature of said body to a maximum temperature of about 650° C. to about 900° C. for a time period of about 0.5 to about 20 hours, whereby said fusing is effected and said amorphous nanoparticles are converted into nanocrystals.

2. The method of claim 1, said contacting step comprising the step of forming a colloidal dispersion of said nanoparticles, and soaking said body in said colloidal dispersion.

3. The method of claim 1, said maximum temperature being about 800° C.

4. The method of claim 1, including the step of progressively increasing the temperature of said body to said maximum heating temperature, keeping the temperature for a period of time ranging from 0 to 0.5 hours, followed by cooling of the body to ambient temperature.

5. The method of claim 4, said maximum temperature being from about 850° C. to 950° C.

6. The method of claim 5, said maximum temperature being about 900° C.

7. The method of claim 4, including the step of heating said body at a rate of at least about 100° C. per hour until said maximum heating temperature is reached.

8. The method of claim 7, said rate being at least about 200° C. per hour or faster.

9. The method of claim 4, including the step of cooling said body at a rate of at least about 100° C. per hour until ambient temperature is reached.

10. The method of claim 9, said rate being at least about 200° C. hour or faster.

11. The method of claim 1, said nanoparticles having a diameter of up to about 300 nm.

12. The method of claim 1, there being at least about $10-10^9$ nanocrystals per $mm^2$ of a surface of said body.

13. The method of claim 12, said nanocrystals being present at a level of from about $10^7-10^9$ nanocrystals per $mm^2$ of said body surface.

14. The method of claim 1, there being at least about $10^3-3\times10^{13}$ nanoparticles per $mm^3$ of surface layer of said body.

15. The method of claim 14, said nanoparticles being present at a level of from about $3\times10^{10}-3\times10^{13}$ nanoparticles per $mm^3$ of said surface layer of said body.

16. The method of claim 1, at least certain of said nanoparticles within said dispersion being yttrium-iron garnet nanoparticles.

17. The method of claim 1, said nanocrystals being rare earth iron garnet nanocrystals.

18. The method of claim 17, said rare earth iron garnet nanocrystals having the formula of $Fe_5Y_{3-x-y}M_xN_yO_{12}$ where M and N are different and are respectively taken from the group consisting of Bi, Gd, In, La, Pr, Nd, Pm, Sm, Eu, Tb, Dy, Ho, Er, Tn, Yb and Ln, and x and y are selected to satisfy the equation of $0 \leq x+y \leq 1$.

19. The method of claim 1, said porous glass body being thirsty glass.

20. The method of claim 1, said nanoparticles being formed by the alkoxide method.

21. The method of claim 1, said dispersion comprising a kerosene and surfactant mixture, said dispersion formed by agitating said nanoparticles in said mixture so as to coat said nanoparticles with said surfactant.

22. A method of forming a composite comprising of the steps of:
   providing a porous glass body;
   contacting said body with a dispersion including amorphous nanoparticles,
   and causing at least some of said nanoparticles to locate within pores of said body; and
   fusing said pores to embed said nanoparticles located in said body;
   wherein said nanoparticles are converted to yttrium iron garnet nanocrystals having the formula $Fe_5Y_3O_{12}$.

23. The method of claim 22, wherein said fusing step comprises the step of heating said body by progressively increasing the temperature of said body to a maximum temperature of about 650° C. to about 900° C. for a time period of about 0.5 to about 20 hours, whereby said fusing is effected and said amorphous nanoparticles are converted into nanocrystals.

24. The method of claim 22, said contacting step comprising the step of forming a colloidal dispersion of said nanoparticles, and soaking said body in said colloidal dispersion.

25. The method of claim 23, said maximum temperature being about 800° C.

26. The method of claim 23, including the step of progressively increasing the temperature of said body to said maximum heating temperature, keeping the temperature for a period of time ranging from 0 to 0.5 hours, followed by cooling of the body to ambient temperature.

27. The method of claim 26, said maximum temperature being from about 850° C. to 950° C.

28. The method of claim 27, said maximum temperature being about 900° C.

29. The method of claim 26, including the step of heating said body at a rate of at least about 100° C. per hour until said maximum heating temperature is reached.

30. The method of claim 29, said rate being at least about 200° C. per hour or faster.

31. The method of claim 26, including the step of cooling said body at a rate of at least about 100° C. per hour until ambient temperature is reached.

32. The method of claim 31, said rate being at least about 200° C. per hour or faster.

33. The method of claim 22, said nanoparticles having a diameter of up to about 300 nm.

34. The method of claim 22, there being at least about $10$–$10^9$ nanocrystals per mm$^2$ of a surface of said body.

35. The method of claim 34, said nanocrystals being present at a level of from about $10^7$–$10^9$ nanocrystals per mm$^2$ of said body surface.

36. The method of claim 22, there being at least about $10^3$–$3\times10^{13}$ nanoparticles per mm$^3$ of surface layer of said body.

37. The method of claim 36, said nanoparticles being present at a level of from about $3\times10^{10}$–$3\times10^{13}$ nanoparticles per mm$^3$ of said surface layer of said body.

38. The method of claim 22, said porous glass body being thirsty glass.

39. The method of claim 22, said nanoparticles being formed by the alkoxide method.

40. The method of claim 22, said dispersion comprising a kerosene and surfactant mixture, said dispersion formed by agitating said nanoparticles in said mixture so as to coat said nanoparticles with said surfactant.

* * * * *